United States Patent [19]

Lee et al.

[11] Patent Number: 4,785,387
[45] Date of Patent: Nov. 15, 1988

[54] RESONANT CONVERTERS WITH SECONDARY-SIDE RESONANCE

[75] Inventors: Fred C. Lee, Blacksburg; Kwang-Hwa Liu, Drapers Meadow, both of Va.

[73] Assignee: Virginia Tech Intellectual Properties, Inc., Blacksburg, Va.

[21] Appl. No.: 856,775

[22] Filed: Apr. 28, 1986

[51] Int. Cl.$^4$ .......................................... H02M 3/335
[52] U.S. Cl. ........................................ 363/21; 363/97; 363/131
[58] Field of Search .................. 363/18, 19, 20, 21, 363/97, 131

[56] References Cited

U.S. PATENT DOCUMENTS

| | | | |
|---|---|---|---|
| 3,582,754 | 6/1971 | Hoffmann et al. | 363/18 |
| 4,016,461 | 4/1977 | Roland | 323/282 X |
| 4,063,306 | 12/1977 | Perkins et al. | 363/56 X |
| 4,168,477 | 9/1979 | Burchall | 323/222 |
| 4,253,136 | 2/1981 | Nanko | 363/21 |
| 4,323,845 | 4/1982 | Leach | 323/272 X |
| 4,415,959 | 11/1983 | Vinciarelli | 363/21 |
| 4,417,197 | 11/1983 | Schwarz | 323/272 |
| 4,441,146 | 3/1984 | Vinciarelli | 363/20 |
| 4,517,633 | 5/1985 | Melcher | 363/21 |
| 4,530,043 | 7/1985 | Palm et al. | 363/21 |
| 4,546,421 | 10/1985 | Bello et al. | 363/21 |
| 4,559,590 | 12/1985 | Davidson | 363/21 |
| 4,585,986 | 4/1986 | Dyer | 323/271 |
| 4,592,763 | 6/1986 | Dietz et al. | 323/271 X |
| 4,593,346 | 6/1986 | Nooijen et al. | 363/21 |
| 4,605,999 | 8/1986 | Bowman et al. | 363/97 X |
| 4,620,271 | 10/1986 | Musil | 323/222 X |

FOREIGN PATENT DOCUMENTS

530402 6/1976 U.S.S.R. ............................ 323/271

Primary Examiner—Patrick R. Salce
Assistant Examiner—Anita M. Ault
Attorney, Agent, or Firm—Mason, Fenwick & Lawrence

[57] ABSTRACT

A family of quasi-resonant converters is disclosed as comprising a voltage source, a transformer having primary and secondary windings, and a switch for periodically coupling the voltage source to the primary winding, whereby a charging current appears on the secondary winding. The transformer exhibits a characteristic leakage inductance. A capacitor exhibiting a characteristic capacitance is coupled to the secondary winding to form a resonant circuit including the leakage inductance and the capacitor. The secondary winding is coupled to apply the charging current to the capacitor. A rectifying circuit couples the capacitor to a load, whereby the voltage stored in the capacitor is delivered to the load. The capacitor is directly connected to the secondary winding and to the rectifying circuit to permit positive and negative going voltages to be stored therein, whereby magnetic flux within the core of the transformer is dissipated and the transformer magnetically reset.

14 Claims, 6 Drawing Sheets

RESONANT CONVERTERS WITH SECONDARY-SIDE RESONANCE

BACKGROUND OF THE INVENTION

1. Field of the Invention:

This invention relates to switching converters particularly adapted to switch at relatively high frequencies and, in particular, to such converters that achieve switching on and off at zero current level, whereby high efficiency at such high frequencies is achieved.

2. Description of the Prior Art:

In conventional resonant switching converters such as DC-to-DC converters, a switching device typically in the form of a semiconductor switch turns on and off repetitively at high current levels to achieve output voltage conversion and regulation. Such converters employ magnetic components such as the energy storage/transfer and ripple/filtering elements. Operating such magnetic components at high frequencies reduces their size and cost. In typical resonant switching converters, the inductive impedance of such magnetic components is coupled in circuit with the semiconductor switches. High frequency switching of such inductive impedances, adversely affects these switches. As the switch is turned on and off rapidly, switching transients involving high levels of current and voltage occur, whereby high switching stresses and losses are imposed upon the semiconductor switch. When such a switch is switched or "forced off", the energy still present in the coupled inductive element imposes high current and high voltage and thus high switching stress and loss on the switch. Furthermore, the pulsating current waveforms resulting from rapid switching, cause severe electromagnetic interaction (EMI) problems as the switching frequency is increased. It is desired to switch such semiconductor switches at relatively high switching frequencies to increase the effectiveness of the voltage control and regulation and, at the same time, minimize the size and cost of the inductive and capacitive elements employed in such converters. However, as the switching frequency increases, the above-noted switching stresses and losses increase and the converter's overall efficiency and reliability decrease.

Snubber circuits are commonly used to alleviate the switching stresses mentioned above. Simple RC or RDC snubber circuits suffer from high power loss at high frequencies. Lossless snubber circuits, on the otherhand, increase circuit complexity considerably.

To overcome these problems of switching stress and loss, the technique of "zero current switching" has been described in "Resonant Switching Power Conversion Technique," by E. E. Buchanan and E. J. Miller, IEEE Power Electronics Specialists Conference, 1975 Record, pp. 188-193 and in "Resonant Switching Power Conversions," by E. J. Miller, IEEE Power Electronics Specialists Conferences, 1976 Record, pp. 206-211. Such "zero current switching" technique utilizes an LC resonant tank circuit to force the current through the semiconductor switch to oscillate, whereby the semiconductor switch turns off at zero current level, thereby drastically reducing switching stresses and losses. However, most of the converters employing this "zero current switching" technique suffers from one or more of the following deficiencies: (1) complicated circuit topology (2) limited range of frequency and power operation, (3) their converter elements require increased voltage and current ratings, (4) complicated control circuitry, and (5) special start-up or shut-down circuitry.

In "Resonant Switches - A Unified Approach to Improve Performance of Switching Converters," by the inventors of this invention, IEEE International Telecommunications Energy Conference, 1984 Proceedings, pp. 344-351, there is described the use of "resonant switches" in various conventional pulse-width modulated switching converters to achieve "zero-current-switching". Generally, such resonant switches are a subcircuit consisting of a semiconductor switch $S_1$, a resonance inductor $L_R$, and a resonance capacitor $C_R$. There are two types of resonant switch configurations as shown respectively in FIGS. 1A and B, an L-type and an M-type resonant switch. In both cases, the inductor $L_R$ is connected in series with the switch $S_1$ to slow down the current change rate, and the capacitor $C_R$ is added as an auxiliary energy storage/transfer element. If switch $S_1$ is a device without reverse voltage blocking capability or contains an internal antiparallel diode, an additional diode $D_1$ is needed and should be connected in series with the switch $S_1$ and the inductor $L_R$. The inductor $L_R$ and the capacitor $C_R$ together constitute a series resonant circuit with respect to the switch $S_1$. When the switch $S_1$ conducts, current flows through switch $S_1$ and inductor $L_1$ into the capacitor $C_1$ with a quasi-sinusoidal waveform. As the inductor current drops to zero, the capacitor voltage is charged up with a negative polarity with respect to switch $S_1$, thus commutating off the switch $S_1$. The resonant switch therefore, provides zero-current-switching properties during both turn-on and turn-off.

Figure 1A:
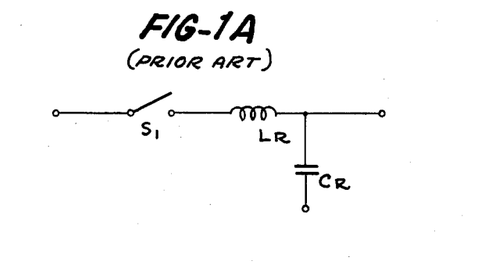
FIGS. 1A and 1B are respectively an L-type and an M-type resonant switch, as known in the prior art.
Figures 2A, 2B:
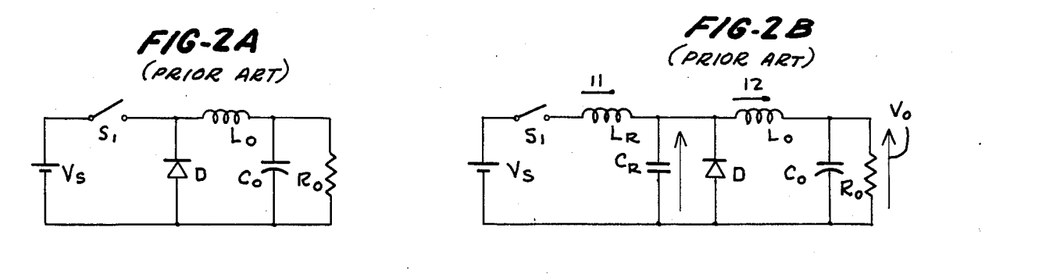
FIGS. 2A, 2B, and 2C are respectively a conventional buck converter, a buck resonant converter incorporating the L-type resonant switch as shown in FIG. 1A, and a buck resonant converter incorporating the M-type resonant switch as shown in FIG. 1B, all known in the prior art.

A conventional buck converter is illustrated in FIG. 2A, as comprising a switch $S_1$ for applying upon being rendered conductive a voltage source $V_s$ across a commutation diode D. The commutation diode D is coupled to an output circuit comprised of an output inductor $L_o$ disposed in circuit with an output capacitor $C_o$ connected in parallel with an output resistor $R_o$. This conventional buck converter is modified as shown in FIG. 2B by the addition of the L-type resonant switch, as first shown in FIG. 1A, between voltage source Vs and the commutation diode D. The output inductance $L_o$ is selected to be much larger than inductance $L_R$, thus making the resonant frequency of the resonant circuit comprised of capacitor $C_o$ and the inductor $L_o$ much smaller than that of the resonant circuit comprised of the capacitor of $C_R$ and the resonant inductor $L_R$. It is also assumed that inductors $L_o$ is sufficiently large so that the current $I_2$ through the inductor $L_o$, remains relatively constant throughout a switching cycle.

Figures 3A, 3B, 3C:
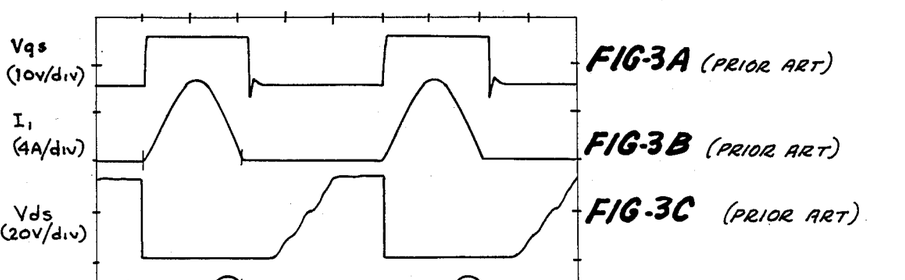
FIGS. 3A, 3B, 3C and 3D are respectively waveforms occurring in the course of the operation of the buck resonant converter as shown in FIG. 2B.

The operation of the buck resonant converter employing the L-type resonance switch as shown in FIG. 2B, will now be explained with reference to the waveforms as shown in FIGS. 3A to 3D. Before time $T_o$, the semiconductor switch $S_1$ is turned off, whereby the commutation diode D carries the output current $I_o$ with the capacitor voltage $V_{CR}$ clamped at zero. In the first of four distinct stages, the semiconductor switch $S_1$ is turned on at time $T_o$, whereby current $I_1$ flowing through the semiconductor switch $S_1$ and the resonant inductor $L_R$ rises linearly as shown in the waveform of FIG. 3B. Between times $T_o$ and $T_1$, the output current $I_2$ shifts gradually from the path through the commutation diode D to the path through the semiconductor switch $S_1$ and the resonant inductor $L_R$.

Figure 3D:
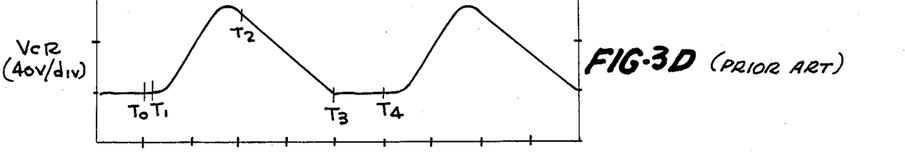

At time $T_1$, the current $I_1$ becomes equal to current $I_2$, whereby the commutation diode D is turned off and, as seen in FIG. 3B, the current $I_1$ begins to charge capacitor $C_R$. As seen in FIG. 3B, the flow of the current of $I_1$ through the resonant inductance $L_R$ and the voltage $V_{CR}$ appearing on resonant capacitor $C_R$ is substantially sinusoidal rising to a peak and falling back to zero at time $T_2$. As shown in FIG. 3D, the voltage $V_{CR}$ rises to a peak of approximately $2V_s$ shortly before time $T_2$, whereby a reverse voltage of $V_{CR}-V_s$ is applied to the semiconductor switch $S_1$ commutating it off naturally at time $T_2$. As shown in FIG. 3B, zero current is flowing in the semiconductor switch $S_1$ at time $T_2$, when it is commutated off. As shown in FIG. 3D, the capacitor $C_R$ discharges in the time interval from time $T_2$ to time $T_3$. The capacitor voltage $V_{CR}$ drops linearly to zero at time $T_3$. In the fourth stage from time $T_3$ to time $T_4$, the output current $I_2$ flows through the commutation diode D and, with the switch $S_1$ open, the resonant capacitor $C_R$ is clamped to zero voltage. At time $T_4$, the switch $S_1$ turns on again, starting the next switching cycle.

Figure 1B:
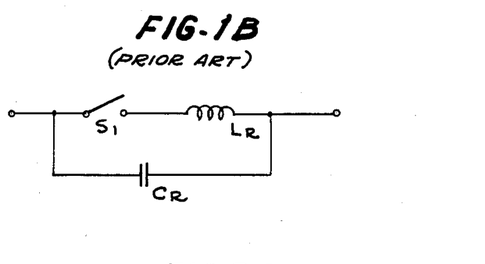
Figure 1K:
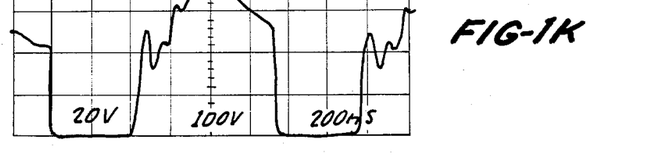
Figure 2C:
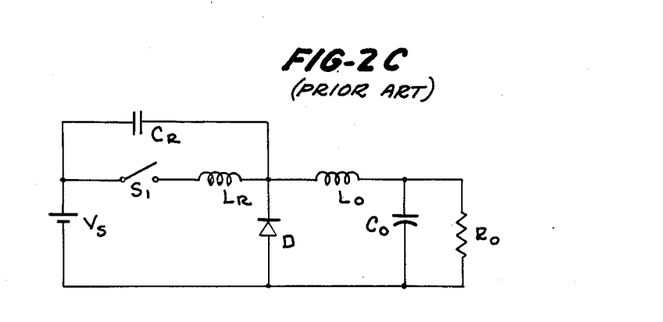

FIG. 2C shows a buck resonant converter circuit in which the resonant capacitor $C_R$ is coupled in parallel between the voltage source $V_s$ and the resonant inductor $L_R$ instead of in parallel with the commutation diode, whereby an M-type resonant switch, as shown first in FIG. 1B, is formed. The modified buck resonant converter of FIG. 2C operates in four stages in a manner similar to the operation of the buck resonant converter as described above with respect to FIG. 2B.

The operation of the converter circuits with the L-type and M-type resonant switches as shown in FIGS. 2B and 2C, is in the half-wave mode as shown in FIG. 3B. In otherwords, the current $I_1$ is permitted to flow through the switch $S_1$ in but a single direction. As will be explained below, these resonant converters as operated in the half-wave mode suffer from a draw back, namely, the DC voltage conversion ratio is sensitive to load variations.

Many DC-to-DC converters incorporate a transformer in order to step-up or -down the output voltage. One difficulty arising out of the incorporation of a transformer, results from the inherent leakage inductance $L_k$ of the transformer. Typically, the leakage inductance $L_k$ of the transformer is coupled to a semiconductor device, which is turning on and off at a relatively high frequency. As the semiconductor switch $S_1$ couples the leakage inductance $L_k$ with other inductive or magnetic components of the converter, spikes or noise occur across the switch. The transformer also serves to provide isolation between the voltage source $V_s$ and the output voltage $V_o$.

U.S. Pat. No. 4,415,959 of Vinciarelli discloses a DC-to-DC forward converter incorporating a transformer and forming an effective LC circuit between the leakage inductance $L_k$ of the transformer and a resonant capacitor coupled by an unidirectional conducting device such as a diode to the secondary coil of the transformer. A switch couples the input voltage $V_s$ to the primary winding and is turned on and turned off at a relatively high frequency, whereby a series of switching cycles occur and energy transfers from the input voltage $V_s$ to the output is achieved. The resonant capacitor is cyclically charged and discharged to deliver its energy to the load. Vinciarelli clearly states that the storage capacitor operates in a half-wave mode and, further, does not, even fractionally, return any energy to the leakage inductance $L_k$. Evaluation of Vinciarelli's converter indicate problems with the incorporation of its transformer and, in particular, of the magnetic flux resetting of the transformer at the end of each cycle in preparation for the next, i.e. Vinciarelli does not apply any negative voltage to the secondary coil or the primary coil of his transformer as would effect such magnetic resetting. If magnetic resetting is not carried out and the magnetic flux within the transformer continues to increase with each switching cycle, the input or primary current passing through the switch, rises quickly to a point where the switch and possibly the transformer are destroyed due to the saturation of the transformer. To overcome these problems, Vinciarelli proposes in his later U.S. Pat. No. 4,441,146, an auxiliary switch actuated during the off period of the primary switch for resetting his transformer. Such auxiliary switch adds complexity and cost to the resulting DC-to-DC converter.

SUMMARY OF THE INVENTION

It is an object of this invention to provide a family of new and improved resonant converters named quasi resonant converters which eliminate switching stresses and losses.

It is a more particular object of this invention to provide a family of new and improved resonant converters, employing switches that turn on and off at zero current conditions.

It is a still further object of this invention to provide a family of new and improved resonant converters, which incorporates a transformer for stepping-up or -down the input, supply voltage and utilizes the transformer leakage inductance in a resonant circuit to achieve switch commutation under zero current conditions.

It is a still further object of this invention to provide a family of new and improved resonant converters employing a transformer and operative in a half-wave mode.

It is a still further object of this invention to provide a family of new and improved resonant converters employing a transformer and operating in a full-wave mode, whereby the converter's voltage conversion ratio is made substantially independent of the variations in the load imposed upon the converter.

It is a still further object of this invention to provide a family of new and improved resonant converters incorporating a transformer and a resonant circuit including the leakage inductance of the transformer, for achieving zero current switching, as well as effective magnetic resetting of its transformer without the use of complex auxiliary control circuitry.

In accordance with these and other objects of this invention, there is disclosed a family of quasi resonant converters comprising a voltage source, a transformer having primary and secondary windings, and a switch for periodically coupling the voltage source to the primary winding, whereby a charging current appears on the secondary winding. The transformer exhibits a characteristic leakage inductance. A capacitor exhibiting a characteristic capacitance is coupled to the secondary winding to form a resonant circuit including the leakage inductance and the capacitor. The secondary winding is coupled to apply the charging current to the capacitor. A rectifying circuit couples the capacitor to a load, whereby the voltage stored in the capacitor is delivered to the load. The capacitor is directly connected to the secondary winding and to the rectifying circuit to permit positive and negative going voltages to be stored therein, whereby magnetic flux within the core of the transformer is dissipated and the transformer magnetically reset.

In a further aspect of this invention, the switch includes a diode connected to conduct in an opposite fashion to that of the switch, whereby the switch may be actuated to apply a current flow from the voltage source to the primary winding of the transformer and upon being deactuated, permit a current flow, in an opposite direction, from the primary winding to the voltage source, whereby the resonant switching converter is operative in a full-wave mode.

BRIEF DESCRIPTION OF THE DRAWINGS

A detailed description of a preferred embodiment of this invention is hereafter made with specific reference being made to the drawings in which:

FIG. 5C shows the circuit elements of a voltage load.

FIGS. 8A, 8B, 8C and 8D show respectively a circuit diagram of a flyback quasi-resonant converter of the prior art, a flyback quasi-resonant converter disposing the resonant capacitor on the secondary side of the transformer, a detailed circuit diagram of a tested flyback quasi-resonant converter, and the equivalent circuit of the flyback quasi-resonant converter as shown in FIG. 6B;

FIGS. 9A, 9B, and 9C show the waveforms of the circuit elements of the circuits of FIGS. 8B, 8C and 8D operated in a half-wave mode, whereas

FIGS. 10D, 10E, 10F and 10G show the waveforms of the circuit elements of the circuit of FIG. 10C, as operative in a full-wave mode, whereas FIGS. 10H, 10I, 10J, and 10K show the waveforms of the circuit elements, without the diode $D_2$, of the circuit of FIG. 10C, as operative in a half-wave mode;

DETAILED DESCRIPTION OF A PREFERRED EMBODIMENT

Figure 5A:
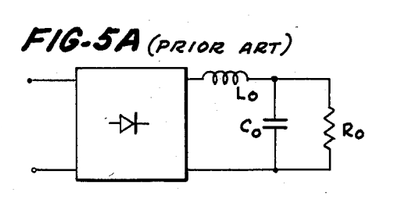
FIG. 5A shows in circuit form a current load for a resonant converter.
Figure 5B:
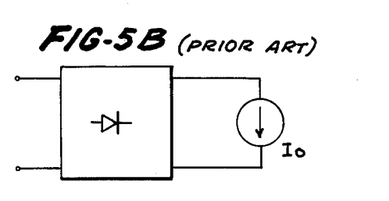
FIG. 5B shows a diagrammatic representation of the circuit elements of the current load as shown in FIG. 5A.
Figure 5C:
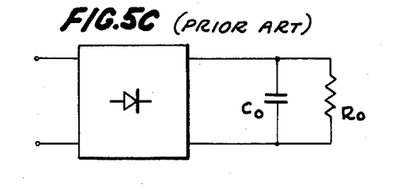
Figure 5D:
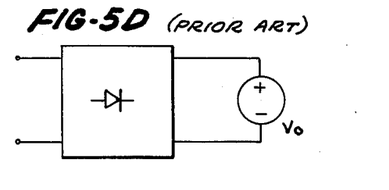
FIG. 5D shows a diagramatical representation of the circuit elements of the voltage load shown in FIG. 5C, all known in the prior art.

Before describing a preferred embodiment of this invention, it is necessary to understand certain topological relationships between the employed resonant switch and its load. During the steady-state operation of a resonant converter circuit, its load circuit appears either as a constant-current sink, or a constant-voltage sink to the converter. Illustratively, a load circuit comprising an output-filtering inductor $L_o$ connected in series with a parallel circuit comprised of an output-filtering capacitor $C_o$ and an output resistor $R_o$ as shown in FIG. 5A, is deemed to be a current load as diagrammatically illustrated in FIG. 5B. By contrast, a load containing only the parallel circuit of the output-filtering capacitor $C_o$ and the resistor $R_o$ as shown in FIG. 5C, is regarded as a voltage load as diagrammatically illustrated in FIG. 5D. A rectifying circuit, as identified by the circuit block bearing the diode, provides a rectified voltage to the loads, in each of FIGS. 5A, 5B, 5C, and 5D.

Figure 5E:
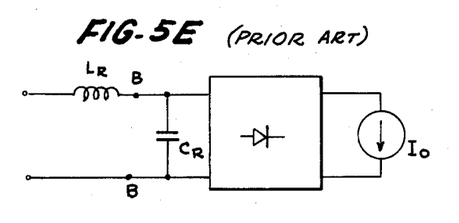
FIGS. 5E and 5F show respectively a parallel resonant converter as coupled via a rectifying circuit to a current load and a series resonant converter coupled via a rectifying circuit to a current load, all known in the prior art.
Figure 5F:
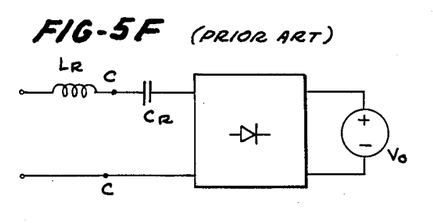

There are two basic types of resonant converters, the parallel resonant converter (PRC), wherein output power to the load is tapped from the resonant capacitor $C_R$ of the circuits LC resonant tank circuit, as shown in FIG. 5E, and a series resonant converter (SRC), wherein the output power is derived from the current drawn through the resonant inductor $L_R$, as shown in FIG. 5F. A voltage source $V_s$ and a corresponding semiconductor switching device $S_1$ (neither shown) is employed with each of the converters of FIGS. 5E and 5F. In the PRC, the voltage imposed on the resonant capacitor $C_R$ is rectified and fed into a current load, while in the SRC, the current flowing through the resonant inductor $L_R$ (and its resonant capacitor $C_R$) is rectified by an appropriate circuit identified by the circuit block bearing the diode and fed into a voltage load. This constraint of employing a particular load type for the PRC or the SRC is required to avoid interference between a particular load circuit and a particular resonant tank circuit. Consider the case where a constant voltage load would be connected to the output of a PRC. Typically, a square-wave voltage is reflected from the voltage load as shown in FIG. 5F and would appear in the hypothetical situation across the resonant capacitor $C_R$. However, in the normal operatio of a PRC, the voltage across the resonant capacitor $C_R$ as shown in FIG. 5E has a smooth quasi-sinusoidal wave form, which would conflict with the square-wave voltage reflected from the constant voltage load. Therefore, the PRC cannot support a voltage load. Similarly, the SRC cannot support a current load.

Figure 5G:
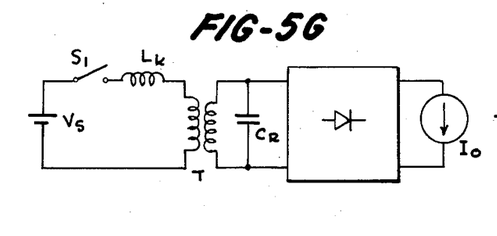
FIGS. 5G and 5H show respectively the incorporation, in accordance with the teachings with this invention, of a transformer into the parallel and series resonant converters.
Figure 5H:
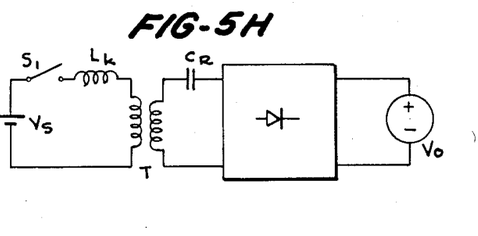

FIGS. 5G and 5H illustrate respectively the incorporation in accordance with the teachings of this invention of a transformer T into each of a PRC and a SRC and of utilizing the transformer's leakage inductance $L_K$ and the resonant capacitor $C_R$ to form the converter's LC resonant tank circuit. As shown in each of FIGS. 5G and 5H, the resonant capacitor $C_R$ is coupled to the secondary coil of the transformer T. The term, secondary-side resonance, is introduced to describe the technique of using the leakage inductance $L_K$ and the resonant capacitor $C_R$ as coupled on the secondary side of the transformer T, to form the converter's resonant tank circuit. As will be described in detail below with respect to the detailed embodiments of this invention, the semiconductor switch $S_1$ is switched on and off at zero-current conditions. In addition, the incorporation of a transformer T, as had posed the problems of imposing voltage spikes and noise on semiconductor switching devices, is now positively employed as the resonant element in the converter's resonant tank circuit. The capacitor voltage $V_{CR}$ is rectified before being applied to the converter's load. The circuit block bearing the diode is a general representation of a rectifying circuit and may take the form of any of a number of well known rectifying circuits. The basic PRC and SRC as illustrated in FIGS. 5G and 5H may be incorporated as will be demonstrated below in a family of similar circuits.

Figure 6A:
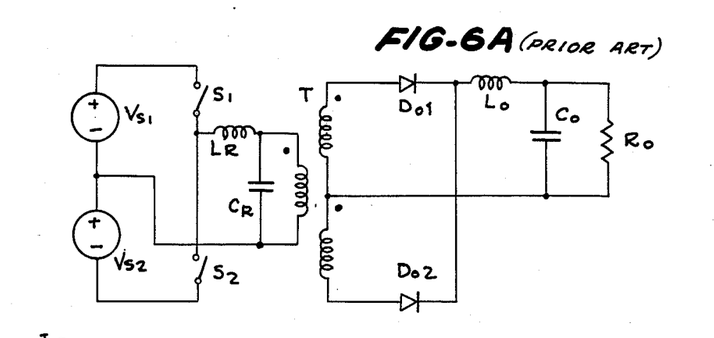
FIGS. 6A and 6B are respectively circuit diagrams of a half-bridge parallel resonant converter employing a resonant capacitor connected on the primary side of its transformer as known in the prior art, and a half-bridge parallel resonant converter employing a resonant capacitor connected on the secondary side of its transformer in accordance with the teachings of this invention.
Figure 6B:
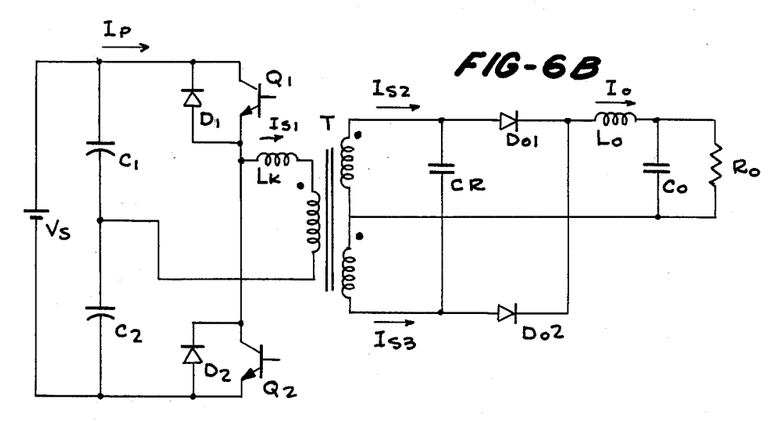

The PRC as first shown in FIGS. 5E is incorporated into a half-bridge converter of the prior art, as shown in FIG. 6A. To incorporate secondary-side resonance into such a prior art circuit, the resonant capacitor $C_R$ is transferred to the secondary side of its transformer T. The basic topology of the half-bridge quasi-resonant converter circuit is shown in FIG. 6B. The input voltage source $V_s$ is divided into two equal voltage sources by a voltage divider comprised of series connected capacitors $C_1$ and $C_2$. Switches $S_1$ and $S_2$ take the form of the semiconductor switch devices $Q_1$ and $Q_2$, which can be bipolar transistors or MOSFET devices, and the corresponding anti-parallel diodes $D_1$ and $D_2$. Transformer T provides a DC isolation between the input voltage source $V_s$ and the current load comprised of output-filter inductor $L_o$, output-filter capacitor $C_o$ and output resistor $R_o$. The resonance capacitor $C_R$ is connected across the center-tapped secondary winding of the transformer T, and is followed by the rectifier diodes $D_{o1}$ and $D_{o2}$, the output-filter inductor $L_o$, the output-filter capacitor $C_o$, and the output resistor $R_o$.

Figure 7A:
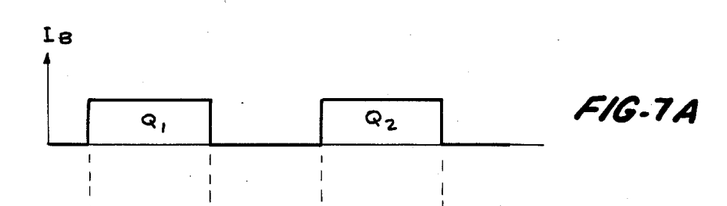
FIGS. 7A, 7B and 7C show respectively different waveforms of the circuit elements of the half-bridge parallel resonant converter operating in the full-wave mode, as shown in FIG. 6B.
Figures 7B, 7C:
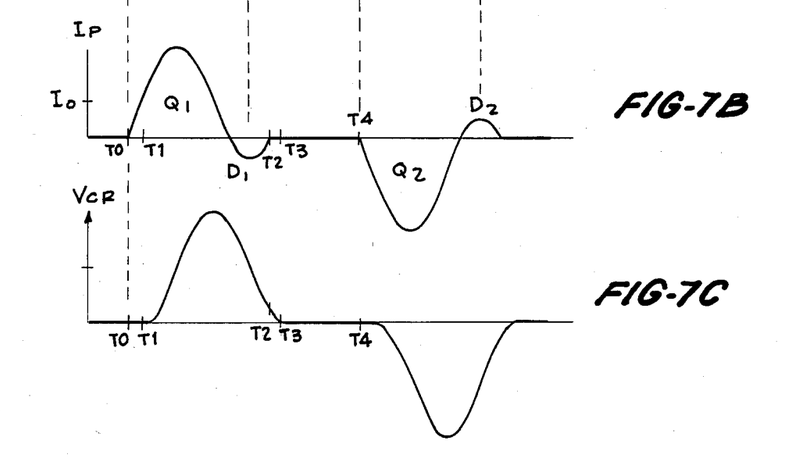

The forward quasi-resonant converter as shown in FIG. 6B includes the MOSFET devices $Q_1$ and $Q_2$ connected respectively with the anti-parallel diodes $D_1$ and $D_2$ to operate in a full-wave mode and to exhibit the waveforms as shown in FIGS. 7A, 7B and 7C. As will now be explained, the forward quasiresonant converter of FIG. 6B operates in four distinct states. Before time $T_o$, the output current $I_o$ is kept constant by the relatively large value of the output-filter inductor $L_o$, both of the MOSFETs $Q_1$ and $Q_2$ are off, capacitor voltage $V_{CR}$ on the resonant capacitor $C_R$ is zero, and the output current $I_o$ is free-wheeling through diodes $D_{o1}$ and $D_{o2}$. At time $T_o$ of the first or linear state, MOSFET $Q_1$ turns on, whereby the input current $I_p$ flows into the transformer T and rises linearly as shown in FIG. 7C.

In the second or resonant state, diode $D_{o2}$ stops conducting at time $T_1$ when the transformer secondary current $I_{s2}$ reaches the level of the output current $I_o$. The transformer secondary current $I_{s2}$ then starts to charge up the resonant capacitor $C_R$ on the secondary side of the transformer T. Due to the resonance circuit formed by the leakage inductance $L_k$ and the resonant capacitor $C_R$, the input current $I_p$ oscillates in a sinusoidal fashion and reverses its direction after a certain time interval. The negative current flows back to the capacitor $C_1$ through the anti-parallel diode $D_1$. The MOSFET $Q_1$ remains conductive as long as the input current $I_p$ is positive. When the input current $I_p$ goes negative, the MOSFET $Q_1$ turns off at zero current, and the anti-parallel diode $D_1$ is rendered forward biased to conduct the negative going input current $I_p$. As the MOSFET $Q_1$ is completing a resonant cycle, a packet of input energy is transferred to and stored in the resonant capacitor $C_R$.

After $D_{o1}$ is off at time $t_2$, the third or recovering stage starts, in which capacitor $C_r$ keeps discharging its energy into the current load until time $t_3$, when its charge is depleted.

At time $T_3$, the fourth or free-wheeling state begins, wherein both diodes $D_{o1}$ and $D_{o2}$ conduct and carry the free-wheeling current through the output-filter inductance $L_o$. At time $T_4$, the MOSFET $Q_2$ turns on again and starts the other half cycle. Input energy in this half cycle is supplied by the voltage imposed on capacitor $C_2$, and the capacitor voltage $V_{CR}$ on the resonant capacitor $C_R$ is charged to a polarity opposite to that of the first half cycle.

Typical waveforms of the forward quasi-resonant converter circuit are illustrated in FIGS. 7A, 7B and 7C. The zero current switching property is evidenced by examining the current and voltage waveforms, i.e. the input current $I_p$ is zero when any of the MOSFETs $Q_1$ and $Q_2$, or the anti-parallel diodes $D_1$ and $D_2$ turn off and on. Also the fact that the energy is transferred to the output in a packet form suggests that the voltage regulation can be achieved by varying the turn-on repetition rate (i.e. the switching frequency $F_s$ of the MOSFETs $Q_1$ and $Q_2$). The resonant frequency $F_n$ is defined as:

$$F_n = 1/(2\pi \sqrt{L_K C_R}).$$

The value of leakage inductance $L_k$ is determined by the transformer's core material and winding technique. An external inductor can be added in series with the transformer T if the intrinsic leakage inductance $L_K$ is too small.

Figure 4A:
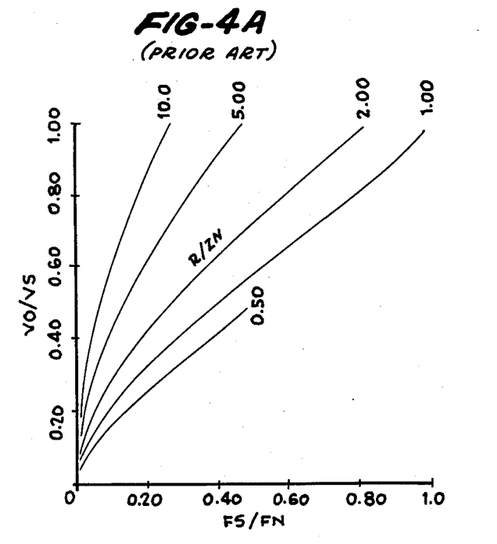
FIGS. 4A and 4B show plots of the voltage conversion ratio, i.e. the ratio of the output voltage $V_o$ to the supply voltage $V_s$ as a function of the ratio of the switching frequency $F_s$ to the resonant frequency $F_n$ of the resonant circuit incorporated within a resonant converter, operating in a half-wave mode and a full-wave mode, respectively.

As shown in FIG. 7C, the input current $I_P$ goes in both a negative and a positive direction, whereby it is said that the half-bridge parallel resonant converter as shown in FIG. 6B, operates in a full-wave mode. By contrast, the buck converter with the L-resonant switch as shown in FIG. 2B, is said to operate in a half-wave mode. As shown in FIG. 3B, the input current $I_1$ of this buck converter does not go negative and there is no corresponding transfer of energy to the voltage source $V_s$. Further, FIG. 4A shows the output-to-input voltage conversion ratio $V_o/V_s$ as a function of the normalized frequency, i.e. the ratio of the switching frequency $F_s$ to the resonant frequency $F_n$ as defined above. As the ratio of $R_o/Z_N$ decreases from 10 to 0.5 corresponding to an increase of load, a distinct graph for each of such loads is shown as a function of the normalized frequency. $R_o$, as explained above, is the resistive component of the converter's load, and $Z_N$ is the characteristic impedance calculated as $$Z_N = \sqrt{L_K/C_R}.$$

Figure 4B:
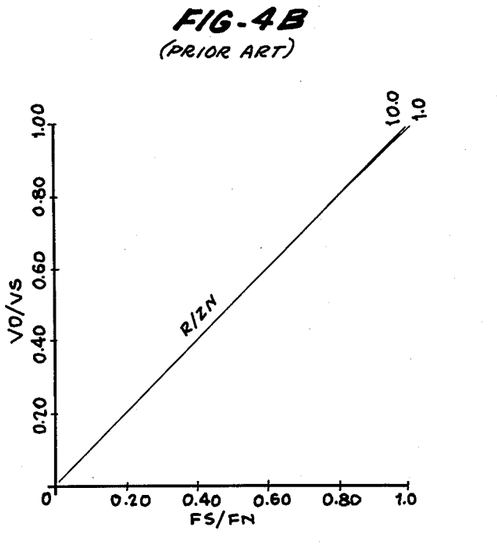

Thus, the buck resonant converter of FIG. 2B exhibit significantly different voltage conversion ratios as its load changes. By contrast, the half-bridge parallel resonant converter of FIG. 6A operates in a full-wave mode as illustrated particularly in FIG. 7C, exhibiting a set of voltage conversion ratios as seen in 4B. As shown, the load on the half-bridge parallel resonant converter may vary significantly, i.e. the ratio $R/Z_N$ may vary from 10 to 1, without significantly changing the voltage conversion ratio. FIG. 4B suggests that the voltage regulation of the half-bridge parallel resonant converter of FIG. 6A, may be dependent upon the normalized switching frequency $F_s/F_n$. Noting that the resonant frequency $F_n$ remains substantially constant once the elements of the circuit are set, the desired conversion ratio may be set in this embodiment by determining the switching frequency $F_s$.

The resonant frequency $F_n$ is dependent as defined above upon the values of the leakage inductance $L_R$ and the resonance capacitor $C_R$. The resonance frequency $F_n$ determines the period and frequency of the oscillations of the input current $I_p$, as shown in FIG. 7B. As shown in FIG. 7C, the period and frequency of the oscillation of the resonant capacitor voltage $V_{CR}$ is dependent upon the values of the resonant capacitor $C_R$ and the magnetic inductance $L_m$ of the transformer T. When the current flows from the secondary of the transformer T to the resonant capacitor $C_R$, the resonant capacitor $C_R$ is charged with an oscillating voltage as shown in FIG. 7C. The period and frequency of the waveform shown in FIG. 7C, is dependent upon the values of the resonant capacitor $C_R$ and the magnetic inductance $L_M$ of the transformer T. As may be observed in FIGS. 7A, 7B, and 7C, the switching frequency $F_s$ of the transistors $Q_1$ and $Q_2$ must be set lower than the frequencies of the waveforms of FIGS. 7B and 7C, to permit the input current $I_p$ and the resonant voltage $V_{CR}$ to return to zero before the next half cycle of operation.

The operation of the half-bridge parallel resonant converter. as shown in FIG. 6B permits the voltage appearing on the resonant capacitor $C_R$ to go negative and positive cyclically, noting that the area under the positive and negative going curves are substantially equal as shown in FIG. 7C. It is understood that if the transformer T were not magnetically reset, the magnetic flux within the core of the transformer T would rapidly increase and within a few switching cycles, the current $I_p$ flowing to the primary winding thereof will increase substantially and destroy the semiconductor devices $Q_1$ and $Q_2$, if not the transformer T, itself. By operating the full-bridge parallel resonant converter to apply both positive and negative voltages to the secondary of the transformer T, any magnetic flux built up within the first half-cycle, is dissipated in the second.

Figure 8A:
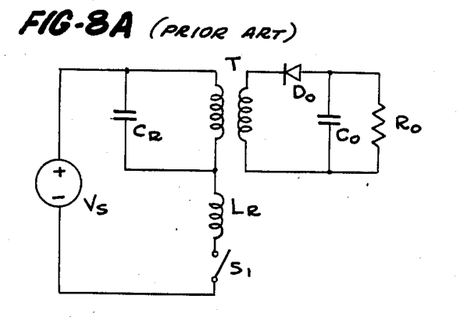
Figure 8B:
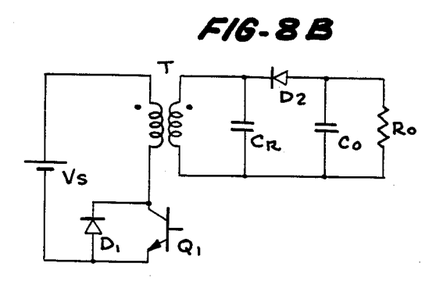

A family of converters known generally as single-ended quasi-resonant converters will be first described. In particular, a single-ended resonant converter such as a flyback converter will be described with regard to FIGS. 8A, 8B, 8C, and 8D. A flyback converter of the prior art is illustrated in FIG. 8A with an L-type resonant switch comprised of a resonant capacitor $C_R$, a resonant inductor $L_R$ and a switch $S_1$, similar to that shown in FIG. 1A. To employ secondary-side resonance the resonant capacitor $C_R$ is moved to the secondary side and is coupled across the secondary coil of the transformer T, as illustrated in FIG. 8B. Further, the resonant inductor $L_R$ is removed, it being essentially replaced by the leakage inductance $L_K$ of the transformer T.

Figures 8C, 8D, 9A:
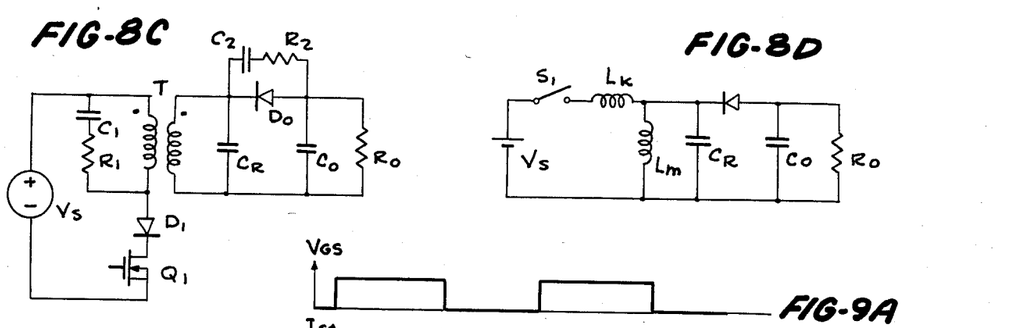
Figure 9B:
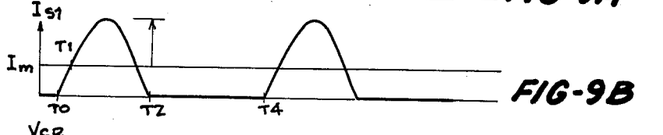
Figure 9C:
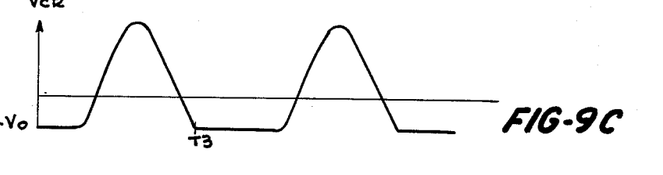
Figure 9D:
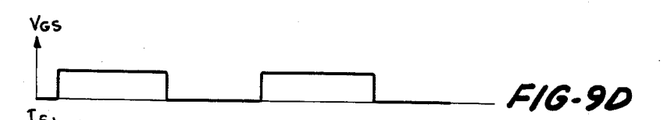
FIGS. 9D, 9E and 9F show the waveforms of the circuit elements of FIGS. 8B, 8C and 8D in a full-wave mode.
Figure 9E:
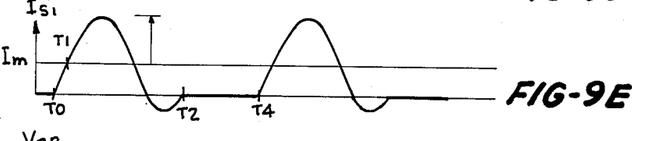
Figure 9F:
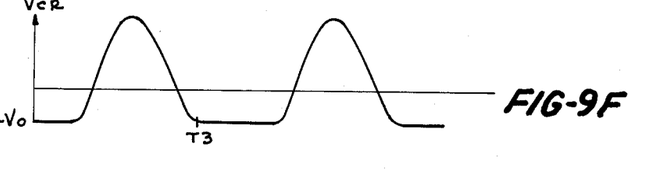

An equivalent circuit of the flyback converter shown in FIG. 8B is illustrated in 8D, wherein the magnetizing inductance $L_m$ is shown as being coupled in parallel with the resonant capacitor $C_R$. Assuming that the value of the magnetizing inductance $L_m$ is large, the current through the magnetizing inductance $L_m$ can be treated as constant during a switching cycle. The operation in terms of four stages of the flyback converter as illustrated in FIGS. 8B and 8D will be explained with respect to the waveforms of FIG. 9. If the switch $S_1$ is implemented by a semiconductor device $Q_1$ and a diode $D_1$ coupled in series with each other as illustrated in FIG. 8C, the resulting switch circuit may only conduct current in the forward biased direction of the diode $D_1$ and the circuit is confined to operate only in a half-wave mode as illustrated by the waveforms of FIGS. 9A, 9B, and 9C. On the other hand, if the switch $S_1$ consists of a semiconductor switching device $Q_1$ and a diode $D_1$ connected in parallel therewith so as to conduct in an opposite direction, the resultant flyback converter is capable of operating in a full-wave mode as illustrated in FIGS. 9D, 9E and 9F. The Diode $D_1$ so connected is known as an anti-parallel diode. As a review of the waveforms will indicate, the flyback converter of FIG. 8C has incorporating the transformer $T_1$ and utilizing secondary side resonant operates to provide the waveforms of FIGS. 9A, 9B and 9C in a half-wave mode similar to that shown and described above for the buck converter shown in FIG. 2B. The flyback converter as shown in FIG. 8B with the anti-parallel diode $D_1$ operates to provide the waveforms of FIG. 9D, 9E and 9F in a fullwave mode similar to the forward converter as will be described with respect to FIG. 10B and 10C.

The flyback converter as shown in FIG. 8C has been built to deliver 30 W and operate at a switching frequency of 800k Hz, i.e. its switch in the form of the FET $Q_1$ is switched on and off at a rate of 800k Hz. A list of illustrative components and impedance values thereof, is provided below:

Transformer T:
    TDK P2213-H6F/A250
    14T/1T
Q1: IRF 730
D1: TRW-DSR-5500X
Do: IR 31DQ06*2
Cr: 0.1u
Co: 1.0u+1000u
C1: 56u
R1: 1 KΩ
C2: 820u
R2: 36Ω

Figure 10A:
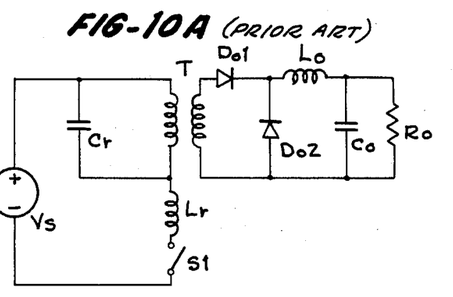
FIGS. 10A, 10B, and 10C show respectively the circuit diagrams of a forward quasi-resonant converter employing a resonant capacitor connected on the primary side of the transformer as known in the prior art, a forward quasi-resonant converter employing a resonant capacitor connected on the secondary side of the transformer and operative in a half-wave mode in accordance with the teachings of this invention, and a forward quasi-resonant converter employing a resonant capacitor connected on the secondary side of its transformer and operative in a full-wave mode in accordance with the teachings of this invention.
Figure 10B:
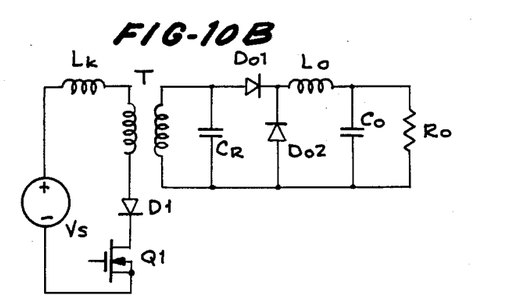
Figure 10C:
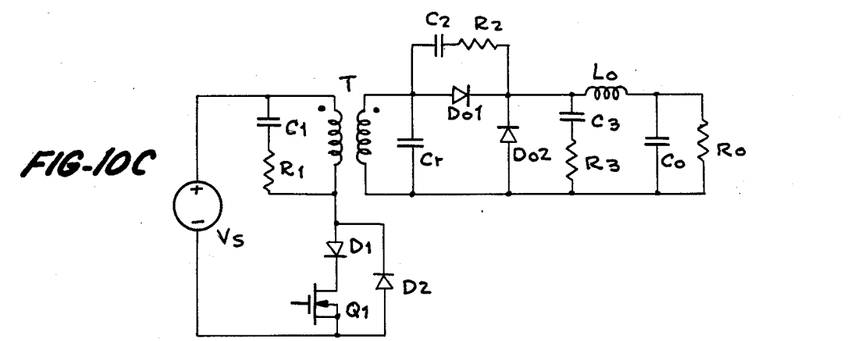
Figure 10D:
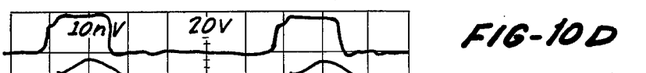
Figure 10E:
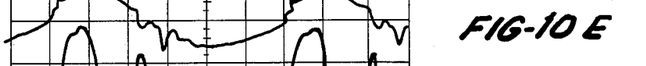
Figure 10F:
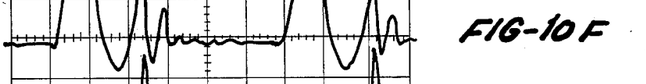
Figure 10G:
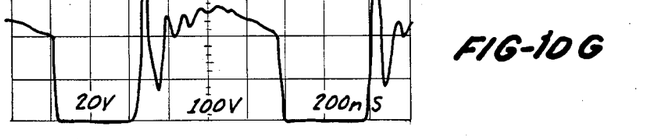
Figure 10H:
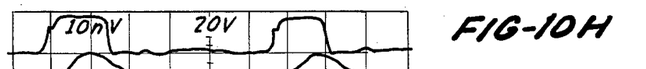
Figure 10I:
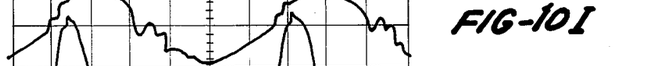
Figure 10J:
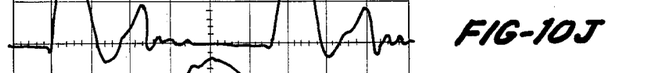

In FIG. 10A, a forward converter of the prior art is shown as incorporating an L-type resonant switch of the type illustrated in FIG. 1A. This prior art circuit can be transformed to utilize secondary-side resonance by shifting the resonant capacitor $C_R$ to be coupled in parallel across the secondary coil of its transformer T. Such a forward converter with secondary-side resonance as illustratively shown in FIG. 8C has been built and tested to deliver 30 W at a switching frequency of 800 kHz. The waveforms appearing on the circuit elements of the forward converter as shown in FIG. 10C as operating in its full-wave mode, are shown in FIGS. 10D, 10E, 10F, and 10G. The resonant capacitor $C_R$ provides a flux reset mechanism for the transformer. After the FET $Q_1$ turns off, the magnetizing current flows to the resonant capacitor $C_R$ from the secondary winding of the transformer T, and the voltage on the resonant capacitor $C_R$ goes negative as shown in FIG. 10E during the off-state of the FET $Q_1$. As explained above, the application of the negative voltage to the transformer T dissipates the magnetic flux otherwise built up within the core of the transformer T, thereby preventing the primary current $I_p$ from increasing to that point that would destroy the FET $Q_1$ and possibly the transformer T, itself. After the magnetizing current is reset to zero, it is forced back into the reverse direction. The slight over-reset is advantageous, since it leads to better balance flux excitation of the transformer T. Another advantage is the elimination of the reset winding and a high voltage diode, which are usually required in the conventional forward converter.

FIGS. 10H, 10I, 10J, and 10K illustrate the waveforms of the circuit elements of the forward converter of FIG. 10C without its anti-parallel diode $D_2$ as the converter operates in its half-wave mode. Observation of the waveforms of FIGS. 10D, 10E, 10F, and 10G, and FIGS. 10H, 10I, 10J, and 10K, indicate that it is necessary to set the resonant frequency $F_n$ of the resonant circuit comprised of the resonant capacitor $C_R$ and the leakage inductor $L_K$, as well as the resonant frequency of the voltage appearing on the capacitor $C_R$ as set by the resonant capacitor $C_R$ and the magnetic inductance $L_m$ of the transformer T, higher than the switching frequency $F_s$ of the FET $Q_1$. Further, observation of the waveforms of FIGS. 10E and 10I, indicative of the voltage appearing on the resonant capacitor $C_R$ in each of the full-wave and half-wave modes of operation, indicates that the areas under the positive and negative going portions of these curves are equal, whereby the transformer T is reset magnetically in both modes.

Figure 11A:
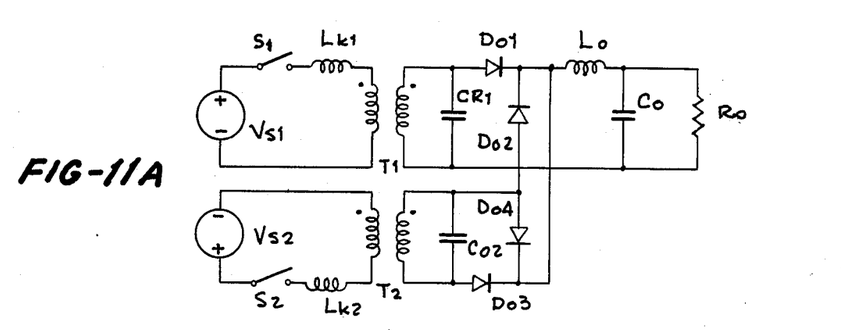
FIGS. 11A and 11B are respectively circuit diagrams of two forward quasi-resonant converters connected in back-to-back arrangement, and a modified arrangement of such a circuit to provide a half-bridge parallel resonant converter.
Figure 11B:
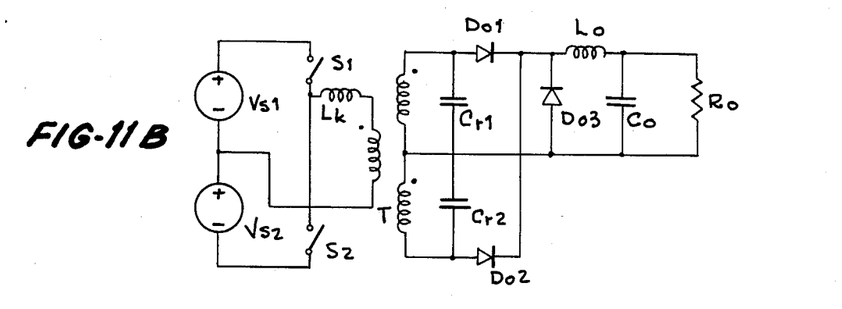

Referring to FIG. 11A, two identical forward converters similar to the circuit of FIG. 8B, are connected back-to-back to form the converter of FIG. 11A. This circuit may be modified to provide the half-bridge PRC of FIG. 11B by incorporating a transformer T having a centertapped secondary winding. The converter of FIG. 11 resembles closely the half-bridge parallel resonant converter as shown and described with respect to FIG. 9B.

Figure 12:
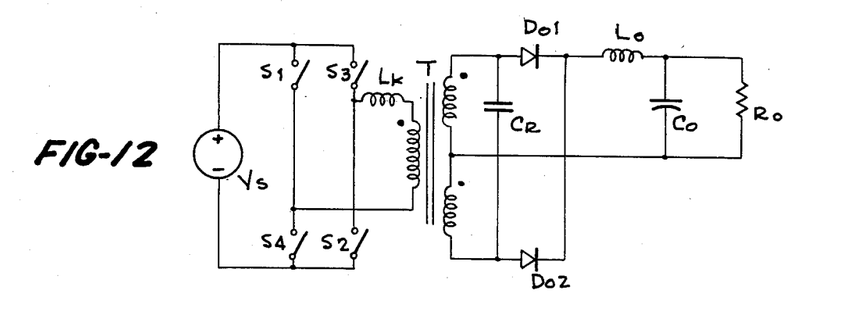
FIG. 12 is a full-bridge parallel resonant converter employing secondary side resonance.

A full-bridge parallel resonant converter is shown in FIG. 12, wherein the two voltage sources $V_{S1}$ and $V_{S2}$ of the converter of FIG. 11 are replaced with a single voltage source $V_s$ and four switches $S_1$, $S_2$, $S_3$ and $S_4$ are coupled as shown in FIG. 12. In operation, switches $S_1$ and $S_2$ are closed simultaneously, while both of switches $S_3$ and $S_4$ remain open during a first half of the switching cycle to apply a positive voltage to the primary winding of the transformer T. In the second half of the cycle, the switches $S_3$ and $S_4$ are both closed, and switches $S_1$ and $S_2$ are both opened, whereby a negative potential is applied to the primary winding of the transformer T.

Figure 13:
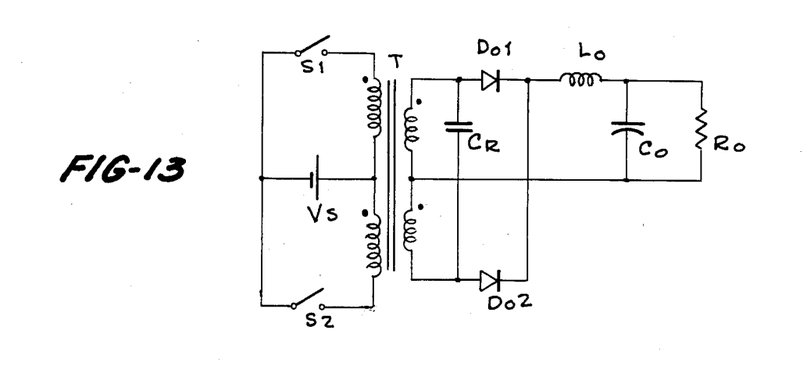
FIG. 13 is a push-pull parallel resonant converter employing secondary side resonance.

FIG. 13 shows a push-pull parallel resonance converter employing a single voltage source $V_s$, a pair of switches $S_1$ and $S_2$ and a transformer T with a split, centertapped primary winding. The switch $S_1$ is closed and switch $S_2$ is opened during the first half cycle, whereby a positive voltage is output on the secondary winding of the transformer T. In the second half of the cycle, switch $S_2$ is closed and switch $S_1$ is opened, whereby a negative potential appears on the secondary winding of the transformer T.

In considering this invention, it should be remembered that the present disclosure is illustratively only and the scope of the invention should be determined by the appended claims.

We claim:

1. A quasi-resonant converter comprising:
   (a) a voltage source;
   (b) a transformer having a primary winding and a secondary winding, said transformer exhibiting a characteristic leakage inductance;
   (c) switch means operating periodically at a switching frequency Fs for coupling said voltage source to said primary winding, whereby a charging current is delivered to said secondary winding;
   (d) a capacitor exhibiting a characteristic capacitance and directly coupled to said secondary winding to form with said characteristic leakage inductance a resonant circuit therewith having a resonant frequency determined by the values of said capacitor and said characteristic leakage inductance so that its resonant frequency is greater than Fs, said capacitor being selectively charged by said charging current from said secondary winding to establish a resonating voltage on said capacitor, said resonating voltage being applied back through said transformer so that said switch means couples said voltage source to said primary winding at zero current conditions across said switch means;
   (e) a load; and
   (f) means coupled between said capacitor and said load for rectifying and applying said voltage stored on said capacitor to said load.

2. The quasi-resonant converter as claimed in claim 1, wherein said switch comprises a uni-polar transistor.

3. The quasi-resonant converter as claimed in claim 1, wherein said switch comprises a FET and a diode coupled in series with said FET.

4. The quasi-resonant converter as claimed in claim 1, wherein said switch is actuated to a first state to apply current in a first direction from said voltage source to said primary winding and to block the current flow in a second, opposite direction, and de-actuated to a second state to apply current in said second direction from said primary winding to said voltage source, and for blocking the flow of current in said first direction, whereby said quasi-resonant converter is operative in a full-wave mode.

5. The quasi-resonant converter as claimed in claim 4, wherein said switch comprises a semiconductor switching device actuable to apply current in said first direction, and a diode coupled in parallel with said semiconductor device to apply current in said second direction.

6. The quasi-resonant converter as claimed in claim 1, wherein said capacitor is coupled in series between said secondary winding and said rectifying means to form a series resonant circuit with said characteristic leakage inductance.

7. The quasi-resonant converter as claimed in claim 6, wherein said load has a resistive component and is characterized as a voltage load.

8. The quasi-resonant converter as claimed in claim 7, wherein said voltage load comprises an output capacitor coupled to said rectifying means and in parallel with said resistive component.

9. The quasi-resonant converter as claimed in claim 1, wherein said capacitor is coupled in parallel with said secondary winding to form a parallel resonant circuit with said characteristic leakage inductance.

10. The quasi-resonant converter as claimed in claim 9, wherein said load exhibits a resistive component and is characterized as a current load.

11. The quasi-resonant converter as claimed in claim 10, wherein said current load comprises an output inductor coupled in series between said rectifying means and an output capacitor, said output capacitor being coupled in parallel to said resistive component.

12. The quasi-resonant converter as claimed in claim 1, wherein said capacitor is directly connected to said secondary winding and to said rectifying means so as to permit said capacitor to charge to both negative and positive going voltages, whereby said transformer is magnetically reset.

13. The quasi-resonant converter as claimed in claim 1, wherein said switch means operates periodically at a switching frequency $F_s$, said capacitor and said characteristic leakage inductance having values such that the resonant frequency of said resonant circuit is greater than $F_s$.

14. The quasi-resonant converter of claim 1, wherein said resonant switch means is bidirectional for periodic actuation and deactuation, and said capacitor exhibiting said characteristic capacitance and directly coupled to said secondary winding to form with said characteristic leakage inductance said resonant circuit, said switch being actuated to a first state to permit a current flow in a first direction from said voltage source to said load via said transformer and to block a current flow in a second, opposite direction, and being actuated to a second state to permit a current flow in said second direction from said load to said voltage source via said transformer and to block the current flow in said first direction for operating said quasi-resonant converter in a full-wave mode, said switch means being actuated to its first state to couple said resonant capacitor and said resonant inductor to form a resonant circuit, and to apply a charging current from said voltage source to said resonant capacitor, said resonant capacitor and said resonant inductor having respective selected impedances to establish a resonating current waveform on said resonant inductor, said resonating current waveform being applied to ensure that said switch is actuated and deactuated under zero current conditions.

* * * * *